Figure 6:
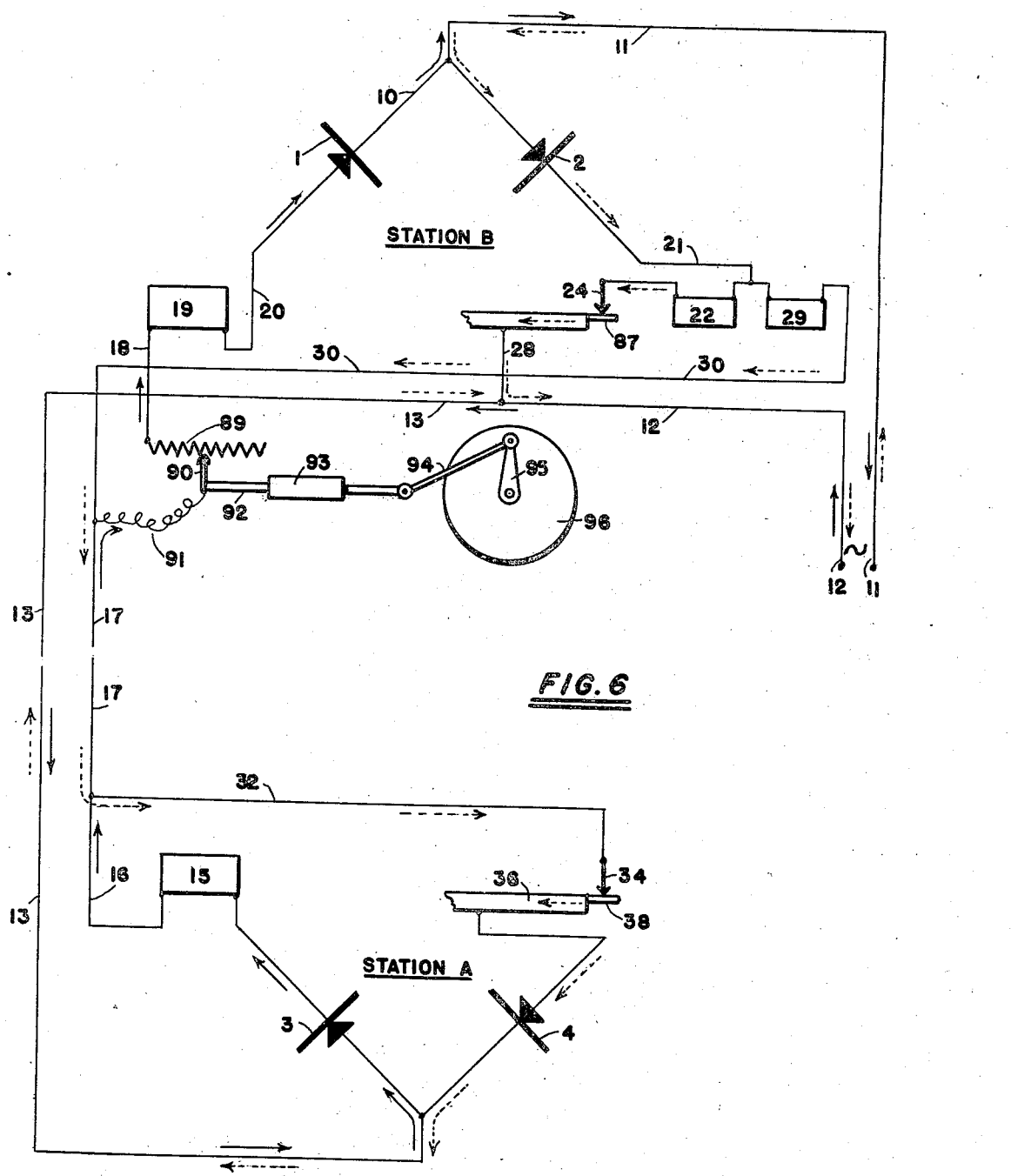

Dec. 10, 1940.  F. F. UEHLING  2,224,709
PRESSURE MEASURING MEANS
Filed Jan. 17, 1939  2 Sheets-Sheet 1
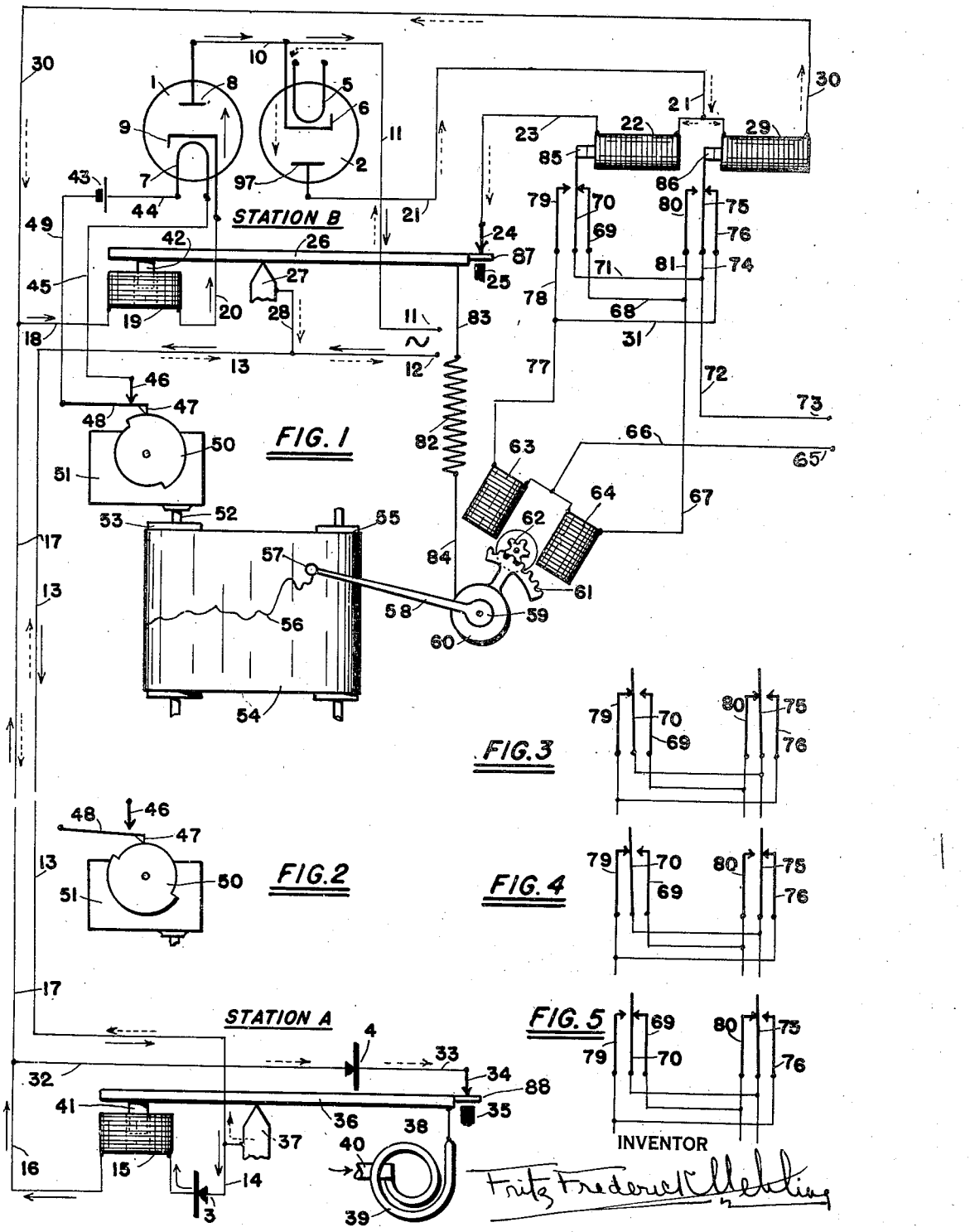
INVENTOR
Fritz Frederick Uehling Dec. 10, 1940.    F. F. UEHLING    2,224,709
PRESSURE MEASURING MEANS
Filed Jan. 17, 1939    2 Sheets-Sheet 2

INVENTOR
Fritz Frederick Uehling

Patented Dec. 10, 1940

2,224,709

UNITED STATES PATENT OFFICE 2,224,709

PRESSURE MEASURING MEANS

Fritz Frederick Uehling, Passaic, N. J.

Application January 17, 1939, Serial No. 251,325

6 Claims. (Cl. 177—351)

This invention relates to improvements in pressure measuring means and particularly to remote pressure measuring means in which the lengths of electrical impulses created by a transmitter are increased or decreased in proportion to changes in the magnitude of the measured pressure and then recorded by a receiver located at some remote point and calibrated in terms of the measured variable, all as covered by my Patent Number 2,136,809 granted November 15, 1938.

One of the objects of this invention is to utilize only a single source of power, located at either the transmitter or the receiver end of such a system, both for creating the electrical impulses and measuring their duration.

Another object of the invention is to utilize the positive half waves of an alternating current for one purpose in a system and the negative half waves for another purpose in the system, both of said half waves being carried by common conductors throughout the entire system except at the points where they are separately and independently utilized.

A further object of the invention is to independently control the positive half waves and the negative half waves of an alternating current carried by a pair of conductors, by means of a novel regulating device for each of said half waves, such a regulating device being located at either or both ends of said pair of conductors.

The above objectives are realized through the novel use of rectifiers which separate the negative half waves from the positive half waves of an alternating current from a given source, after which the negative half waves are transmitted over a conductor through a suitable electrical means, and the positive half waves transmitted over a second conductor through a second suitable electrical means. The two half waves are then again brought together into a common lead at the end of which, through the similar use of rectifiers, the negative half waves and the positive half waves are again separated, the former being transmitted over a third conductor through another suitable electrical means and the latter being transmitted over a fourth conductor through still another electrical means. The two half waves are then again brought together into a second common lead which transmits both half waves of said alternating current back to the source. It is obvious that the negative half waves of the alternating current flowing through the common leads may be controlled by any suitable regulating means in either said first or third conductor, and that the positive half waves of said alternating current may be controlled by any suitable regulating means in said second or fourth conductor. In this invention the electrical means which create the aforesaid electrical impulses are actuated by the half waves of one polarity and the electrical means which control the aforesaid measuring means are actuated by half waves of the opposite polarity. The manner in which said electrical means function and the manner in which said means are regulated in connection with the impulse measuring system set forth in the aforesaid patent is fully described in the following specification:

Figure 1 illustrates diagrammatically a particular form of the invention and includes all of the elements thereof and the electric circuits involved; Figure 2 illustrates a clock actuated switch in a position opposite to that shown in Figure 1; Figures 3, 4 and 5 illustrate different positions of the switches actuated by relays 22 and 29 of Figure 1. Figure 6 illustrates a modification of the invention.

For the purpose of illustration I have chosen the torque of a Bourdon spring 39, station A Figure 1, as the force or pressure to be measured, said torque being a variable depending upon the pressure of a fluid applied at the inlet 40. The closed end of the Bourdon spring is connected with one end of a beam 36 by means of a flexible connecting link 38. The beam is supported by a fulcrum 37, the torque of the Bourdon spring being balanced by a solenoid 15 which reacts with the opposite end of the beam through an iron core 41 fastened thereto as illustrated. The motion of the beam in a clockwise direction is limited by a stop 35, while said motion in a counter-clockwise direction is limited by a fixed contact 34 with which a contact piece 88, which is an integral part of the beam, is capable of making electric contact. It thus follows that when a magnetic force created by the solenoid 15 is greater than the force of the Bourdon spring 39, contact will be established between 34 and 88, and conversely when the torque of the Bourdon spring 39 is greater than the force created by the solenoid, contact between 34 and 88 will be broken. The Bourdon spring 39, the beam 36, the fulcrum 37 and the solenoid 15 in combination with the contacts 34 and 88 and two half wave rectifiers 3 and 4, constitute the transmitter and is designated in Figure 1 as station A.

A similar beam 26, station B Figure 1, is provided with a fulcrum 27, its clockwise motion being limited by a stop 25 and its counter-clockwise motion by a fixed contact 24 with which the contact piece 87 is capable of making electric connection. A spring 82 the tension of which tends to move the beam in a clockwise direction is connected with one end of the beam by means of a flexible link 83, the other end of the spring being connected with a drum 60 by means of a flexible wire 84. The drum 60 is mounted on a shaft 59 supported by bearings not shown, and is capable of being rotated in one direction or the other, to increase or decrease the tension of the spring, by means of a pinion 62 which meshes with a rack 61 the latter being also fastened to the shaft 59. The tension of the spring 82 is opposed by a solenoid 19 which reacts with an iron core 42 fastened to the other end of the beam. It thus follows that when the magnetic force created by the solenoid 19 exceeds the tension of the spring 82, contact will be established between 24 and 87, and conversely when the tension of the spring 82 exceeds the magnetic force of the solenoid 19, contact between 24 and 87 will be broken. The pinion 62 is on the shaft of a reversible electric motor which, when energized through a winding 63, will rotate the drum 60 in a clockwise direction to decrease the tension of the spring 82, and which when energized through a second winding 64 will rotate said drum in the opposite direction to increase the tension of the spring 82. The spring 82 which is influenced by said motor, the beam 26, the fulcrum 27 and the solenoid 19 in combination with the contacts 24 and 87 and two half wave rectifiers 1 and 2 constitute the receiver and is designated in Figure 1 as station B.

The circuits through the motor windings 63 and 64 are controlled by means of two relays 22 and 29. These relays when simultaneously energized, Figure 1, establish contact between blades 70 and 69, and between 75 and 76 respectively, and simultaneously break contact between the blades 70 and 79, and between the blades 75 and 80 respectively. Similarly when said relays are simultaneously deenergized, Figure 3, contact will be established between blades 70 and 79, and between blades 75 and 80 respectively while contact between blades 70 and 69, and between blades 75 and 76 will be simultaneously broken. The blades 70 and 79, 70 and 69, 75 and 80, and 75 and 76 will hereinafter be referred to as switches 70—79, 70—69, 75—80, and 75—76 respectively. The circuit through the motor winding 63 includes the two switches 70—79, and 75—76 in parallel, said circuit being closed through switch 70—79, Figures 3 and 4, when relay 22 is deenergized, or through switch 75—76, Figures 1 and 4, when relay 29 is energized. Similarly the circuit through the motor winding 64 includes the two switches 70—69 and 75—80 in parallel, said circuit being closed through switch 70—69, Figures 1 and 5, when relay 22 is energized or through switch 75—80, Figures 3 and 5, when relay 29 is deenergized. In other words the circuit through the motor winding 63 starts at the source 65—73, thence through wire 66 to the winding 63 and when the relay 29 is energized said circuit continues through wires 77, 81, switch 75—76 and wire 72 back to the source, or when the relay 22 is deenergized said circuit continues from the winding 63 through wires 77, 78, switch 70—79 and wires 71 and 72 back to the source. Similarly the circuit through the motor winding 64 starts at the source 65—73 thence through wire 66 to the winding 64 and when the relay 22 is energized said circuit continues through wires 67, 68, switch 70—69 and wires 71 and 72 back to the source, or when the relay 29 is deenergized said circuit continues from the winding 64 through wires 67, 81, switch 75—80 and wire 72 back to the source. It thus follows that when the relays 22 and 29 are simultaneously energized said switches will assume the positions illustrated in Figure 1 in which both of the motor windings 63 and 64 will be excited (electrically opposed) and the motor will refuse to function. Similarly when the relays are simultaneously deenergized, said switches will assume the positions illustrated in Figure 3 in which both of the motor windings 63 and 64 will again be excited (electrically opposed) and the motor will refuse to function. On the other hand when relay 22 is energized and relay 29 deenergized, the switches will assume the positions illustrated in Figure 5 in which only the motor windings 64 will be excited thus causing the drum 60 to rotate in the proper direction to increase the tension of the spring 82. Similarly when the relay 29 is energized and the relay 22 deenergized, the switches will assume the positions illustrated in Figure 4 in which only the motor windings 63 will be excited thus causing the drum 60 to rotate in the opposite direction to decrease the tension of the spring 82. The manner in which the relays 22 and 29 are energized and deenergized to excite the motor windings 63 and 64 as required to measure the fluid pressure exerted at 40 will be presently described.

As previously stated one of the important features of this invention lies in the fact that while both the current which energizes the relays 22 and 29, and the current which energizes the solenoids 15 and 19 is supplied by a single source of alternating current, only the positive half waves of said alternating current (power supply) are utilized to energise the solenoids 15 and 19, and only the negative half waves of said alternating current (regulating current) are utilized to energize the relays 22 and 29 for controlling the position of a measuring or indicating element 58, or vice versa. The advantage gained by the novel utilization of the negative half waves of an alternating current for one purpose, and the positive half waves of said current for an entirely different and independent purpose will be obvious from the following description:

The alternating current from the source 11—12, Figure 1, is represented by dotted and full line arrows, the full line arrows representing the positive half waves (current flowing in one direction) and the dotted arrows representing the negative half waves (current flowing in the opposite direction). The positive half waves are held to their designated course by means of two rectifiers, one consisting of an electronic tube type rectifier 1 located at station B and consisting of the usual cathode 9 and anode 8, and the other constituting a copper oxide rectifier 3 located at station A. The circuit consisting of the positive waves and represented by the full line arrows starts at the source 11—12, thence through wires 13 and 14 to the copper oxide rectifier 3, from the copper oxide rectifier through the solenoid 15, and wires 16, 17 and 18 to the solenoid 19, and from said solenoid through wire 20, rectifier 1 and wires 10 and 11 back to the source. Similarly the negative half waves are held to designated courses by means of two additional rectifiers, one consisting of an electronic tube type rectifier 2 located at station B and consisting of the usual cathode 6 and anode 97, and the other consisting of a copper oxide rectifier 4 located at station A. There are two circuits which conduct the negative half waves as represented by the dotted line arrows, the first of which includes the relay 22 and is controlled by contact between 24 and 87 at station B, and the second of which includes the relay 29 and is controlled by contact between 34 and 88 at station A. The first of said negative wave circuits (dotted arrows) starts at the source 11—12, thence through wire 11 to the rectifier 2, from the rectifier 2 through wire 21, relay 22 and wire 23 to the contact 24, and when the contact piece 87 touches the contact 24 said circuit continues through the beam 26, the fulcrum 27 and wire 28 back to the source 11—12. Similarly the second of said negative half wave circuits (dotted arrows) starts at the source 11—12, thence through wire 11 to the rectifier 2 located at station B, from the rectifier 2 through wire 21, relay 29 and wires 30, 17 and 32 to rectifier 4 located at station A, from rectifier 4 through wire 33 to the contact 34, and when the contact piece 88 touches the contact 34 said circuit continues through the beam 36, the fulcrum 37 and wire 13 back to the source 11—12. It thus follows that both the relays 22 and 29 are energized by the negative half waves from the alternating current source 11—12, the relay 22 being energized or deenergized depending upon whether contact is made or broken between 24 and 87, and the relay 29 being energized or deenergized depending upon whether contact is made or broken between 34 and 88.

The cathode of rectifier 2 is heated in the usual manner by a filament 5 which is energized by means of a continuous current from an independent source not shown. The cathode 9 of rectifier 1 is however heated by a filament 7 which is included in an independent circuit with a source of energy 43 and a switch consisting of a resilient blade 48 and a contact 46. The resilient blade 48 is provided with a shoe 47 which rests against a cam 50 which cam is driven by means of a clock 51 at a given velocity (for example four revolutions per minute) in a clockwise direction. The cam 50 is so designed that during one half of each revolution the blade 48 will assume the position illustrated in Figure 1, in which contact will be established between 46 and 48 to close the circuit through the filament 7, and during the remaining half of each revolution said blade will assume the position illustrated in Figure 2 in which contact between 48 and 46 will be broken to open the circuit through the filament 7. It follows therefore that the temperature of the cathode 9 due to the radiant heat from the filament will increase during each one half revolution of the cam and decrease during each of the other half revolutions of the cam. In other words the temperature of the cathode 9 will alternately increase and decrease in regular and continuous cycles thus causing a unidirectional current (straight line arrows) through the solenoids 15 and 19, which current due to said changes in temperature of the cathode 9, alternately increases and decreases in magnitude in regular and continuous cycles. Since the same current flows through the solenoids 15 and 19, it is obvious that the magnetic force of reaction between the solenoid 15 and the core 41 which force tends to move the beam 36 in a counter-clockwise direction will increase and decrease in continuous cycles simultaneously with the magnetic force of reaction between the solenoid 19 and the core 42 which latter force tends to move the beam 26 in a counter-clockwise direction. It thus follows that the tension of the spring 82 which varies with the position of the drum 60 and which tends to move the beam 26 clockwise, is opposed by the alternately increasing and decreasing magnetic force of the solenoid 19 which tends to move the beam counter-clockwise, said beam being limited in its clockwise motion by the stop 25 and in its counter-clockwise motion by the contact 24. Similarly the tension of the spring 39 which varies with the magnitude of the fluid pressure applied at 40 and which tends to move the beam 36 clockwise is opposed by said alternately increasing and decreasing magnetic force of the solenoid 15 which tends to move the beam counter-clockwise, said beam being limited in its clockwise motion by the stop 35 and in its counter-clockwise motion by the contact 34.

Let us now assume that the force which the measured fluid pressure exerts on the beam 36 through the link 38 is sufficient to separate the contact piece 88 from the fixed contact 34 against the magnetic force of solenoid 15 for all magnitudes of the current flowing through the solenoids below a certain assumed magnitude, and above which assumed magnitudes of said current the magnetic force of the solenoid is capable of maintaining contact between 88 and 34 against the torque 39. Similarly let us assume that when the magnitude of the current flowing through the solenoids 15 and 19 is greater than said assumed magnitude, the magnetic force of the solenoid 19 is capable of maintaining contact between 87 and 24 against the tension of spring 82, and that when the magnitude of the current flowing through the solenoids is less than said assumed magnitude, the tension of the spring 82 is capable of breaking contact between 24 and 87 against the magnetic force of solenoid 19. Under such conditions (which will, in the future, be referred to as a normal balance between torque of spring 39 and the tension of spring 82) it is obvious that, as the current from the rectifier 1 alternately increases and decreases, contact between 34 and 88 to energize relay 29 will be established simultaneously with contact between 24 and 87 to energize relay 22, and similarly contact between 34 and 88 and contact between 24 and 87 will be broken simultaneously to simultaneously deenergize said relays. In other words so long as said relationship between the torque of 39 and the tension of 82 remains unchanged, so long will the relays 22 and 29 be simultaneously energized and simultaneously deenergized. Under this action of the relays and in the manner previously described, the motor will be maintained in an electrically opposed condition (both windings 63 and 64 excited) under which condition the drum 60 will remain at rest and the tension of spring 82 will remain unchanged. If, however, the magnitude of the fluid pressure applied at 40 increases, then the force applied to the beam 36 through the link 38 will also increase thus requiring a current through 15 of greater magnitude to create the necessary magnetic force to establish contact between 34 and 88 against the increased torque of the spring 39. Under these conditions, as the current through the solenoids 15 and 19 increases, contact between 24 and 87 will be established to energize relay 22 before contact is established between 34 and 88 to energize relay 29, the delay in making contact between 34 and 88 being obviously due to the increased torque of spring 39 which the solenoid 15 must overcome. Similarly as the magnitude of the current through the solenoids 15 and 19 decreases, contact between 34 and 88 will be broken to deenergize relay 29 before contact between 24 and 87 is broken to deenergize relay 22. In other words so long as the normal balance between the torque of spring 39 and the tension of the spring 82 is destroyed by an increase in the fluid pressure applied at 40, so long will the relay 22 be energized before relay 29 is energized during increasing magnitudes of the current flowing through 15 and 19, and similarly so long will the relay 29 be deenergized before relay 22 is deenergized during decreasing magnitudes of the current flowing through 15 and 19. Under this action of the relays and in the manner previously described, no current will flow through motor winding 63 during the period in which relay 22 is energized and relay 29 deenergized and only the winding 64 will be excited thus causing the drum 60 to move in a counter-clockwise direction to increase the tension of spring 82. The motor will thus function to increase the tension of spring 82 during each period in which the relay 22 is energized and relay 29 simultaneously deenergized, until the tension of said spring has again reached a normal balance with spring 39 under which condition contact between 34 and 88 and contact between 24 and 87 will again be simultaneously made to simultaneously energize relays 22 and 29 during that part of each cycle in which the current through the solenoids 15 and 19 is increasing. Similarly under said reestablished balance between 82 and 39, contact between 34 and 38, and between 24 and 87 will again be simultaneously broken to simultaneously deenergize relays 22 and 29 during that part of each cycle in which the current through its solenoids 15 and 19 is decreasing. Under these conditions and in the manner previously stated both of the motor windings 63 and 64 will remain electrically excited (electrically opposed), the drum 60 will again remain at rest and the tension of spring 82 will remain unchanged.

On the other hand if the magnitude of the fluid pressure applied at 40 decreases, then the force applied to the beam 36 through the link 38 will also decrease thus requiring less current through the solenoid 15 to create the necessary magnetic force to establish contact between 34 and 88 against the smaller torque of the spring 39. Under these conditions, as the current through the solenoids 15 and 19 increases, contact between 34 and 88 will be established to energize relay 29 before contact is established between 24 and 87 to energize relay 22. Similarly, as the magnitude of the current through the solenoids 15 and 19 decreases, contact between 24 and 87 will be broken to deenergize relay 22 before contact between 34 and 88 is broken to deenergize relay 29. In other words so long as the normal balance between the torque of spring 39 and the tension of the spring 82 is destroyed by a decrease in the fluid pressure applied at 40, so long will the relay 29 be energized before relay 22 is energized during increasing magnitudes of the current flowing through 15 and 19, and similarly so long will the relay 22 be deenergized before relay 29 is deenergized during decreasing magnitudes of the current flowing through 15 and 19. Under this action of the relays, and in the manner previously described, no current will flow through the motor winding 64 during the period in which relay 29 is energized and relay 22 deenergized and only the motor winding 63 will be excited thus causing the drum 60 to move in a clockwise direction to decrease the tension of spring 82. The motor will thus function to decrease the tension of spring 82 during each period in which the relay 29 is energized and relay 22 simultaneously deenergized until the tenbalance with spring 39 under which condition contact between 34 and 88 and contact between 24 and 87 will again be simultaneously made to simultaneously energize relays 22 and 29 during that part of each cycle in which the current through the solenoids 15 and 19 is increasing. Similarly under said reestablished normal balance between 82 and 39, contact between 34 and 88, and between 24 and 87 will again be simultaneously broken to simultaneously deenergize relays 22 and 29 during that part of each cycle in which the current through the solenoids 15 and 19 is decreasing. Under these conditions, and in the manner previously described, both of the motor windings 63 and 64 will remain electrically excited (electrically opposed), the drum 60 will again remain at rest, and the tension of the spring 82 will remain unchanged. It follows therefore that the drum 60 will move in a clockwise or counterclockwise direction in proportion to changes in the fluid pressure applied at 40, or in proportion to any other force applied to the beam 36 through the link 38. In order to provide a record of such changes, the arm 58 is fastened to the drum 60 with a pen or marker 57 at its extremity. Said marker slides over a moving paper ribbon or chart 54 which is driven by a cylinder 53, said cylinder being driven by the clock 51 and coordinated with a second cylinder 55 mounted on bearings not shown to maintain the chart 54 in the proper position with respect to the marker.

Another form of the invention is illustrated in Figure 6 in which copper oxide rectifiers are substituted for the electronic tube type rectifiers illustrated in Figure 1. In this case the positive half wave current flowing through the solenoids 15 and 19 is alternately increased and decreased by means of a variable resistance in series with said solenoids, said variable resistance consisting of a resistance wire 89, a brush 90 which rides on the wire and is capable of being moved backward and forward over the entire length of the resistance wire by means of a reciprocating member 92 carried by a bearing 93. The reciprocating motion of the member 92 is caused by means of a clock or motor 96 which continuously drives a crank 95 with which the reciprocating member is connected by means of a connecting rod 94. The current flowing through the solenoid circuit constitutes the positive half waves from the alternating current source 11—12, said positive half wave current being represented by the straight line arrows. This circuit starts at the source 11—12 thence through wire 13 to the rectifier 3, from the rectifier 3 located at station A, through the solenoid 15, wires 16, 17, and the flexible connection 91 to the brush 90, from the brush through the resistance wire 89 to the solenoid 19 and, from said solenoid through wire 20, rectifier 1 located at station B, and thence through the wires 10 and 11 back to the source. It is obvious that the alternately increasing and decreasing of the magnitude of the current flowing through the solenoids 15 and 19 as caused by the continuous back and forth motion of the brush 90, Figure 6, corresponds to the alternately increasing and decreasing of the magnitudes of the current flowing through the solenoids as caused by the alternately increasing and decreasing temperature of the cathode 9, Figure 1, said change in temperature being effected in Figure 1 by the continuous opening and closing of the cir- The circuits through the relays 22 and 29, Figure 6, are the same as in Figure 1, except that in the former case a copper oxide rectifier is substituted for rectifier 2 of Figure 1. In other words the circuit through the relay 22, Figure 6, which carries only negative half waves starts at the source 11—12, thence through wire 11, rectifier 2 and wire 21 to the relay 22, from relay 22 when contact is established between 24 and 87, the circuit continues through the beam and wires 28 and 12 back to the source. Similarly the circuit through relay 29, Figure 6, which carries only negative half waves starts at the source 11—12, thence through wire 11 to the rectifier 2 located at station B, and thence through wire 21 to the relay 29, from relay 29 through wires 30, 17, and 32 to contact 34 and when contact is established between 34 and 38 the circuit continues through the rectifier 4 located at station A, and thence through wires 13 and 12 back to the source.

It is obvious that the pressure measuring means as above described can be very advantageously used as a telemetering system in which the transmitter, station A Figure 1, would consist of the balanced beam 36, the contact members 34 and 88, the solenoid 15 and the two rectifiers 3 and 4, the variable force to be measured being applied to the beam through the link 38. The remaining elements of the system would constitute the receiver. It is obvious that one of the novel and important features of such a system when used as a telemeter lies in the fact that although only a two wire connection is required between the transmitter (station A) and the receiver (station B), no source of power is required at the transmitter end of the system. The power source which is required at the transmitter of other types of telemeters is provided in this system as positive half waves from a source of alternating current at the receiving end of the system while the negative half waves from the same source are utilized in the novel manner described to actuate the measuring means. It is of course obvious that said single source of power (alternating current) may be provided at either the transmitting or receiving end of such a system.

I claim:

1. In a device of the class described, the combination with a movable contact member, of a solenoid which when energized reacts with the movable contact member to force it against a fixed contact member, a spring the tension of which opposes the force of the solenoid and tends to move the movable contact member away from the fixed contact member, electrical means for increasing the tension of the spring, a second electrical means for decreasing the tension of the spring, a second movable contact member, a second solenoid which, when energized, reacts with the second movable contact member to force it against a second fixed contact member, means for applying a variable force to the second movable contact member to oppose the force of the second solenoid, said variable force tending to move the second movable contact member away from the second fixed contact member, a relay for controlling a circuit through the first electrical means, a circuit for energizing the relay said circuit being closed or opened by the first movable contact member and the first fixed contact member, a second relay for controlling a circuit through the second electrical means, a circuit for energizing the second relay said circuit being closed or opened by the second movable contact member and the second fixed contact member, a circuit which includes the solenoids in series, and means for alternately increasing and decreasing the current through the solenoids in continuous cycles.

2. In a device of the class described, the combination with a movable member, of a spring which applies a force to the movable member in a given direction, an electrical means for applying a force which tends to move the member in the opposite direction, a second movable member, means for applying a variable force to the second movable member and which tends to move it in one direction, a second electrical means for applying a force which tends to move the second movable member in the opposite direction, an electronic rectifier consisting of an anode and a cathode with means for heating the cathode, means for automatically increasing and decreasing the heat input to the heating means in regular and continuous cycles, a second rectifier for passing current in said one direction, said second rectifier being in series with said electronic rectifier and in series with said two electrical means, a third rectifier and a fourth rectifier each in series with the other and both for passing current in the opposite direction, a source of alternating current for supplying current through each of said electrical means in said one direction and for supplying current through the third and fourth rectifiers in said opposite direction, a switch actuated by the second movable member for controlling the current through the third and fourth rectifiers, a second switch actuated by the first movable member for controlling the current through the third rectifier only, and means controlled by the two switches for changing the tension of the spring.

3. In a device of the class described, the combination with a switch actuated by a movable member, of means for applying a force to the movable member which tends to open the switch, a solenoid which reacts with the member in the proper direction to close the switch, a second switch actuated by a second movable member, means for applying a force to the second movable member which tends to open the second switch, a second solenoid which reacts with the second movable member in the proper direction to close the second switch, means controlled by the two switches for changing the magnitude of the first force, and means for alternately and simultaneously increasing and decreasing the magnitude of the current flowing through both solenoids.

4. In a device of the class described, the combination with a switch actuated by a movable member, of means for applying a force to the movable member which tends to open the switch, a solenoid which when energized reacts with the member to close the switch, a second switch actuated by a second movable member, a second means for applying a force to the second movable member which tends to open the second switch, a second solenoid which when energized reacts with the second movable member in the proper direction to close the switch, two relays, the first of which is controlled by the first switch and the second of which is controlled by the second switch, a source of alternating current consisting of two terminals, a conductor for electrically connecting the first of said terminals with a junction of two conducting branches, the first of said branches including the second relay in series with a rectifier for conducting current through said branch in one direction only, and the second of said branches including the first solenoid in series with a second rectifier for conducting current in the opposite direction only, means in the second branch for alternately increasing and decreasing the current flowing through said branch, a second junction at which said branches reunite, a second conductor for electrically connecting said second junction with a third junction of a third and fourth branch, the third of said branches including the second switch and a third rectifier for conducting current in said branch in said one direction only, and the fourth of said branches including the second solenoid and a fourth rectifier for conducting current in said opposite direction only, a fourth junction at which said third and fourth branches reunite, a third conductor for electrically connecting the fourth junction with a fifth junction, an electric connection between the fifth junction and the second terminal, a second electric connection between the fifth junction and the first terminal which includes the first switch, the first relay and the first rectifier in series, and means controlled by the relays for changing the magnitude of the force applied to the first movable member by the first force applying means.

5. In a device of the class described, the combination of two electric circuits the energy through each of which is supplied from a common source of alternating current, a first and a second rectifier each of the same polarity and connected in series in the first of said circuits for conducting the positive half waves from the source, a third and a fourth rectifier of the opposite polarity connected in series in the second of said circuits for conducting the negative half waves from the source, a switch for opening or closing the second circuit, an electrical means in the first circuit which tends to actuate the switch in one direction, means for applying a force to the switch which tends to actuate it in the opposite direction, a third circuit which receives its energy from the same source and which includes the third rectifier and a second switch for opening or closing said circuit, a second electrical means in the first circuit which tends to actuate the second switch in one direction, a spring for applying a force to the second switch and which tends to actuate it in the opposite direction, a third and a fourth electrical means for controlling the tension of the spring said third electrical means being included in the second circuit and said fourth electrical means being included in the third circuit, and independent means for controlling the current through the first circuit.

6. In a system of the class described, the combination of a transmitter consisting of an electrical means for opening and closing a switch to create electrical impulses, means controlled by changes in a variable condition for changing the length of said impulses, a rectifier in series with the switch for passing current through the switch in one direction only, and a second rectifier in series with the electrical means for passing current through the electrical means in the opposite direction only, a receiver consisting of a second electrical means for opening and closing a second switch to create independent electrical impulses, means controlled by the relative lengths of both of said impulses for changing the length of the independent impulses, a third rectifier in series with the second switch for passing current through the second switch in the said one direction only and a fourth rectifier in series with the second electrical means for passing current through the second electrical means in the said opposite direction only, an electric connection between the transmitter and the receiver for transmitting the current both in the said one direction through the first and third rectifiers and in the said opposite direction through the second and fourth rectifiers, a source of alternating current for supplying the current in both of said directions, and means for alternately increasing and decreasing the flow of current in the said opposite directions through said first and second electrical means.

FRITZ FREDERICK UEHLING.